US012783595B2

(12) United States Patent
Kulkarni et al.

(10) Patent No.: US 12,783,595 B2
(45) Date of Patent: Nov. 3, 2026

(54) MACHINE LEARNING BASED PREDICTION OF FASTEST SOLVER COMBINATION FOR SOLUTION OF MATRIX EQUATIONS

(71) Applicant: Tata Consultancy Services Limited, Mumbai (IN)

(72) Inventors: Hrishikesh Nilkanth Kulkarni, Pune (IN); Dilshad Ahmad, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 697 days.

(21) Appl. No.: 18/457,958

(22) Filed: Aug. 29, 2023

(65) Prior Publication Data

US 2024/0126830 A1 Apr. 18, 2024

(30) Foreign Application Priority Data

Oct. 13, 2022 (IN) ............................ 202221058588

(51) Int. Cl.

*G06F 17/11* (2006.01)
*G06F 17/16* (2006.01)
*G06F 30/27* (2020.01)
*G06F 30/28* (2020.01)
*G06F 111/10* (2020.01)

(52) U.S. Cl.

CPC .............. *G06F 17/11* (2013.01); *G06F 17/16* (2013.01); *G06F 30/27* (2020.01); *G06F 30/28* (2020.01); *G06F 2111/10* (2020.01)

(58) Field of Classification Search

CPC ....................................................... G06F 17/11
See application file for complete search history.

(56) References Cited

U.S. PATENT DOCUMENTS

2010/0082509 A1 4/2010 Mishev et al.

OTHER PUBLICATIONS

Sood, Kanika, "Automated Selection of Numerical Solvers", Date: 2015, Link: https://www.cs.uoregon.edu/Reports/DRP-201510-Sood.pdf (Year: 2015).*

(Continued)

*Primary Examiner* — Jeff Zimmerman
(74) *Attorney, Agent, or Firm* — Finnegan, Henderson, Farabow, Garrett & Dunner LLP

(57) ABSTRACT

Machine Learning approaches in literature for determining optimal solver-preconditioner-smoother for solving matrix equations in computer modelling of any systems are directly dependent on matrix property calculation as an intermediate step. However, in CFD domain, this matrix system is generated from simulation input parameters. Also, part of simulation parameter's relation with the matrix equations can be derived from the theory. Embodiments of the present disclosure provide a method and system for prediction of fastest solver combination for solution of matrix equations during CFD simulations. The system trains a Machine Learning (ML) model using a set of relevant input parameters, based on domain knowledge of a CFD problem of interest, as a plurality of input features. The ML model is a multi-class classification model for the prediction of solver combination taking the CFD simulation parameters as an input.

9 Claims, 11 Drawing Sheets

(56) References Cited

OTHER PUBLICATIONS

Bhowmick, S. et al., "Non-Invasive Blood Pressure Estimation from ECG Using Machine Learning Techniques", International Journal of High-Performance Computing Applications, Date: 2006, https://citeseer.ist.psu.edu/viewdo0/download7doi=10.1.107.36188reperep1&bpes.pdf (Year: 2006).*

Aliaga, José I. et al., "Exploiting Task and Data Parallelism in ILUPACK's Preconditioned CG Solver on", NUMA Architectures and Many-core Accelerators, Parallel Computing, Date: 2016, vol. 54, Publisher: Elsevier, https://www.researchgate.net/publication/287147995 (Year: 2016).*

Eller, Paul R. et al., "Dynamic linear solver selection for transient simulations using multi-label classifiers", Procedia Computer Science, Date: 2012, vol. 9, Publisher: Elsevier, https://www.sciencedirect.com/science/article/pi/S1877050912002886 (Year: 2012).*

Claeys, Petra et al., "Automatic numerical solver selection from a repository of pre-run simulations", Water Sci Technology, Date: 2009, vol. 59; Issue: 5, https://www.researchgate.net/publication/24189180 Automatic numerical solver selection from a repository of pre-run simulations (Year: 2009).*

George, Thomas, "A Recommendation System for Preconditioned Iterative Solvers", Dissertation, Date: 2009, https://core.ac.uk/download/pdf4281361.pdf (Year: 2009).*

Sood, Kanika, "Automated Selection of Numerical Solvers", Date: 2015, Link: https://www.cs.uoreong.edu/Reports/DRP-201510-Sood.pdf.

Bhowmick, S. et al., "Non-Invasive Blood Pressure Estimation from ECG Using Machine Learning Techniques", Title of the item: International Journal of High-Performance Computing Applications, Date: 2006, Link: https://citeseerx.ist.psu.edu/viewdoc/download?doi=10.1.1_107.3618&rep=rep1&type=pdf.

Aliaga, José I. et al., "Exploiting Task and Data Parallelism in ILUPACK's Preconditioned CG Solver on", NUMA Architectures and Many-core Accelerators, Title of the item: Parallel Computing, Date: 2016, vol. 54, Publisher: Elsevier, Link: https://www.researchgate.net/publication/287147995_Exploiting_Task_and_Data_Parallelism_in_ILUPACK%27s_Preconditioned_CG_Solver_on_NUMA_Architectures_and_Many-core_Accelerators.

Eller, Paul R. et al., "Dynamic linear solver selection for transient simulations using multi-label classifiers", Title of the item: Procedia Computer Science, Date: 2012, vol. 9, Publisher: Elsevier, Link: https://www.sciencedirect.com/science/article/pii/S1877050912002886.

Claeys, Petra et al., "Automatic numerical solver selection from a repository of pre-run simulations", Title of the item: Water Sci Technology, Date: 2009, vol. 59; Issue: 5, Link: https://www.researchgate.net/publication/24189160_Automatic_numerical_solver_selection_from_a_repository_of_pre-run_simulations.

George, Thomas, "A Recommendation System for Preconditioned Iterative Solvers", Title of the item: Dissertation, Link: https://core.ac.uk/download/pdf/4261361.pdf.

* cited by examiner

800 receiving a plurality of input parameters comprising a plurality of parameters associated with numerically discretized geometry that defines fluid dynamics domain and a plurality of CFD model parameters of a CFD model. 802 training a plurality of ML models using a supervised learning technique for predicting a fastest solver combination having a minimum simulation time for the CFD model, a solver combination comprising a solver and at least one of a preconditioner and a smoother, wherein each of the plurality of ML models are trained using ML model input data generated by: (a)identifying a set of relevant input parameters from among the plurality input parameters as a plurality of input features by a feature selector in accordance with domain knowledge of a CFD problem of interest, eliminating dependency of training of the plurality of ML models based on properties of a matrix system comprising a plurality of matrix equations generated from the plurality of governing equations, (b)identifying a plurality of solver combinations as a plurality of output features by a combination generator using a solver list, a preconditioner list and a smoother list, wherein the plurality of solver combinations is arranged in ascending order of relevance into a plurality of bins, tagged with a plurality of associated labels based on a simulation time, for defining the plurality of output features, and wherein the relevance of each of the plurality of solver combinations is estimated as a simulation time taken by a solver combination for the simulation of the CFD model; and (c)combining the set of relevant input parameters and the plurality of solver combinations by an input generator, to generate the ML model input data 804

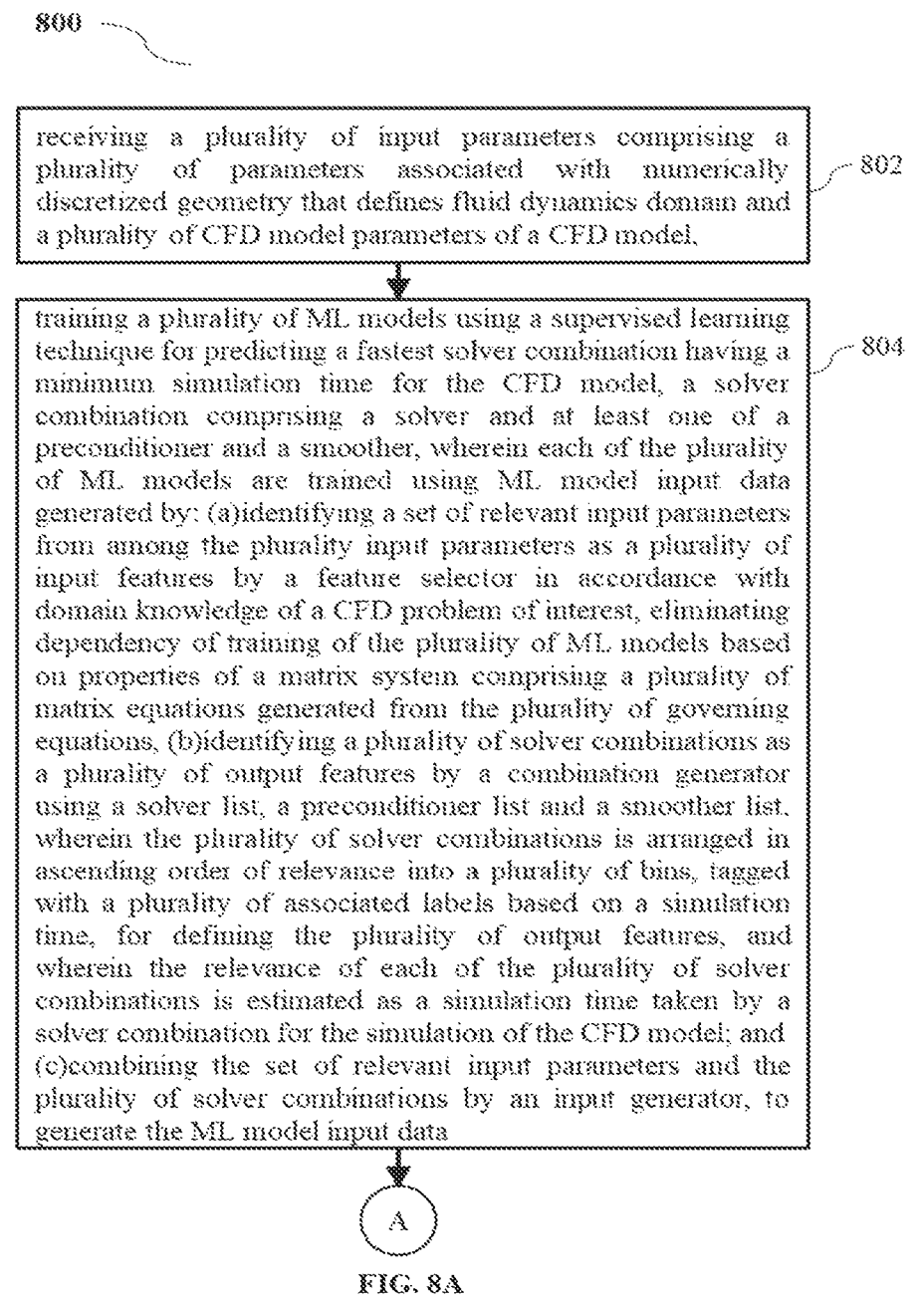

A

FIG. 8A

MACHINE LEARNING BASED PREDICTION OF FASTEST SOLVER COMBINATION FOR SOLUTION OF MATRIX EQUATIONS

PRIORITY CLAIM

This U.S. patent application claims priority under 35 U.S.C. § 119 to: Indian Patent Application No. 202221058588, filed on 13 Oct. 2022. The entire contents of the aforementioned application are incorporated herein by reference.

TECHNICAL FIELD

The embodiments herein generally relate to the field of numerical simulation and, more particularly, to a method and system for prediction of fastest solver combination for solution of matrix equations for numerical simulations.

BACKGROUND

Computational modelling and simulation of many industrial problems results in a set of simultaneous linear equations or matrix equations. For practical problems, these linear equations have large number of terms. In order to solve these linear equations, direct and iterative solvers are used.

Each of these solvers can solve a specific class of matrix system efficiently. The class of these matrix system can be derived from the structure and properties of the coefficient matrices. Thus, solver selection process has a direct dependency on matrix system. Calculation of matrix properties is a computation expensive and time-consuming task.

An efficient solution of a matrix system requires a selection of a suitable pre-conditioner, smoother and solver combination along with tuning parameters since it results in fast solution for a system. Selection of solvers, other than the suitable combination, leads to increased solution time for the same accuracy and hence inefficient. Manual choice of an optimal combination is difficult due to the fact that the optimal combination for a given matrix system may not be optimal for a same problem with slight difference in as properties of the matrix formed and its implication on the choice of the solver combination is not readily available. As a result, the optimal combination needs to be found for each simulation problem to complete simulation in least amount of time. This in turn results in completion of the simulation in least resource and money.

Machine Learning (ML) approaches have enabled automating the process of selection of solver combination. However, the ML based approaches in the literature require calculations of the properties of the coefficient matrix as an intermediate step for the solver selection. Thus, existing approaches are inefficient as calculation of matrix properties is a computationally expensive and time-consuming task and is a technical limitation of the works in the art.

SUMMARY

Embodiments of the present disclosure present technological improvements as solutions to one or more of the above-mentioned technical problems recognized by the inventors in conventional systems.

For example, in one embodiment, a method for prediction of fastest solver combination for solution of matrix equations for numerical simulations is provided.

The method comprises a training phase to train a plurality of Machine Learning (ML) models and identify a best model for prediction during an inferencing mode. In addition to inferencing mode, the method also provides a self-learning mode that enables in background continuously identifies a revised best model based on the new inputs received during inferencing mode. Thus, whenever the revised model is generated, the best ML model is updated with the revised best model and used further for inferencing.

The training phase includes receiving a plurality of input parameters comprising a plurality of parameters associated with numerically discretized geometry that defines a fluid dynamics domain and a plurality of Computational Fluid Dynamics (CFD) model parameters of a CFD model. The plurality of CFD model parameters comprise a plurality of governing equations, one or more initial and boundary conditions, a plurality of numerical schemes designed for discretizing each of plurality of terms of the plurality of governing equations, and a plurality of solution algorithms and simulation control parameters. The training is performed using a supervised learning technique for predicting a fastest solver combination having a minimum simulation time for the CFD model, a solver combination comprising a solver and at least one of a preconditioner and a smoother. The plurality of ML models are trained using ML model input data generated by:

a) identifying a set of relevant input parameters from among the plurality input parameters as a plurality of input features by a feature selector in accordance with domain knowledge of a CFD problem of interest, eliminating dependency of training of the plurality of ML models based on properties of a matrix system comprising a plurality of matrix equations generated from the plurality of governing equations,
b) identifying a plurality of solver combinations as a plurality of output features by a combination generator using a solver list, a preconditioner list and a smoother list, wherein the plurality of solver combinations is arranged in ascending order of relevance into a plurality of bins, tagged with a plurality of associated labels based on a simulation time, for defining the plurality of output features, and wherein the relevance of each of the plurality of solver combinations is estimated as a simulation time taken by a solver combination for the simulation of the CFD model; and
c) combining the set of relevant input parameters and the plurality of solver combinations by an input generator, to generate the ML model input data.

From the plurality of trained ML models, a best machine Learning (ML) model is selected by applying a performance specific threshold to the plurality of trained ML models. Further, a plurality of ML model parameters for prediction accuracy of the best ML model are optimized to generate an optimized best ML model to be used during an inferencing mode.

During the inferencing mode the one or more hardware processors are configured to predict via the optimized best ML model the fastest solver combination for each of a plurality of new input parameters associated with each of a plurality of CFD model of interests. The predicted fastest solver combination is used to solve the plurality of matrix equations generated from the plurality of governing equations of the CFD model of interest for performing CFD simulation.

Further, in self-learning mode, each of the new set of plurality of input parameters that are received during the inferencing mode are continuously shared with the self-learning mode to determine a revised best ML model with optimized plurality of ML model parameters, and wherein the best ML model is updated with the revised best ML model whenever the revised ML model is determined.

In another aspect, a system for prediction of fastest solver combination for solution of matrix equations for numerical simulations is provided. The system comprises a memory storing instructions; one or more Input/Output (I/O) interfaces; and one or more hardware processors coupled to the memory via the one or more I/O interfaces, wherein the one or more hardware processors are configured by the instructions to The system comprises a training phase to train a plurality of Machine Learning (ML) models and identify a best model for prediction during an inferencing mode. In addition to inferencing mode, the system also provides a self-learning mode that enables in background continuously identifies a revised best model based on the new inputs received during inferencing mode. Thus, whenever the revised model is generated, the best ML model is updated with the revised best model and used further for inferencing.

The training phase includes receiving a plurality of input parameters comprising a plurality of parameters associated with numerically discretized geometry that defines a fluid dynamics domain and a plurality of Computational Fluid Dynamics (CFD) model parameters of a CFD model. The plurality of CFD model parameters comprise a plurality of governing equations, one or more initial and boundary conditions, a plurality of numerical schemes designed for discretizing each of plurality of terms of the plurality of governing equations, and a plurality of solution algorithms and simulation control parameters. The training is performed using a supervised learning technique for predicting a fastest solver combination having a minimum simulation time for the CFD model, a solver combination comprising a solver and at least one of a preconditioner and a smoother. The plurality of ML models are trained using ML model input data generated by:

a) identifying a set of relevant input parameters from among the plurality input parameters as a plurality of input features by a feature selector in accordance with domain knowledge of a CFD problem of interest, eliminating dependency of training of the plurality of ML models based on properties of a matrix system comprising a plurality of matrix equations generated from the plurality of governing equations,
b) identifying a plurality of solver combinations as a plurality of output features by a combination generator using a solver list, a preconditioner list and a smoother list, wherein the plurality of solver combinations is arranged in ascending order of relevance into a plurality of bins, tagged with a plurality of associated labels based on a simulation time, for defining the plurality of output features, and wherein the relevance of each of the plurality of solver combinations is estimated as a simulation time taken by a solver combination for the simulation of the CFD model; and
c) combining the set of relevant input parameters and the plurality of solver combinations by an input generator, to generate the M model input data.

From the plurality of trained ML models, a best machine Learning (ML) model is selected by applying a performance specific threshold to the plurality of trained ML models. Further, a plurality of ML model parameters for prediction accuracy of the best ML model are optimized to generate an optimized best ML model to be used during an inferencing mode.

During the inferencing mode the one or more hardware processors are configured to predict via the optimized best ML model the fastest solver combination for each of a plurality of new input parameters associated with each of a plurality of CFD model of interests. The predicted fastest solver combination is used to solve the plurality of matrix equations generated from the plurality of governing equations of the CFD model of interest for performing CFD simulation.

Further, in self-learning mode, each of the new set of plurality of input parameters that are received during the inferencing mode are continuously shared with the self-learning mode to determine a revised best ML model with optimized plurality of ML model parameters, and wherein the best ML model is updated with the revised best ML model whenever the revised ML model is determined.

In yet another aspect, there are provided one or more non-transitory machine-readable information storage mediums comprising one or more instructions, which when executed by one or more hardware processors causes a method for prediction of fastest solver combination for solution of matrix equations for numerical simulations is provided.

The method comprises a training phase to train a plurality of Machine Learning (ML) models and identify a best model for prediction during an inferencing mode. In addition to inferencing mode, the method also provides a self-learning mode that enables in background continuously identifies a revised best model based on the new inputs received during inferencing mode. Thus, whenever the revised model is generated, the best ML model is updated with the revised best model and used further for inferencing.

The training phase includes receiving a plurality of input parameters comprising a plurality of parameters associated with numerically discretized geometry that defines a fluid dynamics domain and a plurality of Computational Fluid Dynamics (CFD) model parameters of a CFD model. The plurality of CFD model parameters comprise a plurality of governing equations, one or more initial and boundary conditions, a plurality of numerical schemes designed for discretizing each of plurality of terms of the plurality of governing equations, and a plurality of solution algorithms and simulation control parameters. The training is performed using a supervised learning technique for predicting a fastest solver combination having a minimum simulation time for the CFD model, a solver combination comprising a solver and at least one of a preconditioner and a smoother. The plurality of ML models are trained using ML model input data generated by:

a) identifying a set of relevant input parameters from among the plurality input parameters as a plurality of input features by a feature selector in accordance with domain knowledge of a CFD problem of interest, eliminating dependency of training of the plurality of ML models based on properties of a matrix system comprising a plurality of matrix equations generated from the plurality of governing equations,
b) identifying a plurality of solver combinations as a plurality of output features by a combination generator using a solver list, a preconditioner list and a smoother list, wherein the plurality of solver combinations is arranged in ascending order of relevance into a plurality of bins, tagged with a plurality of associated labels based on a simulation time, for defining the plurality of output features, and wherein the relevance of each of the plurality of solver combinations is estimated as a simulation time taken by a solver combination for the simulation of the CFD model; and c) combining the set of relevant input parameters and the plurality of solver combinations by an input generator, to generate the M model input data.

From the plurality of trained ML models, a best machine Learning (ML) model is selected by applying a performance specific threshold to the plurality of trained ML models. Further, a plurality of ML model parameters for prediction accuracy of the best ML model are optimized to generate an optimized best ML model to be used during an inferencing mode.

During the inferencing mode the one or more hardware processors are configured to predict via the optimized best ML model the fastest solver combination for each of a plurality of new input parameters associated with each of a plurality of CFD model of interests. The predicted fastest solver combination is used to solve the plurality of matrix equations generated from the plurality of governing equations of the CFD model of interest for performing CFD simulation.

Further, in self-learning mode, each of the new set of plurality of input parameters that are received during the inferencing mode are continuously shared with the self-learning mode to determine a revised best ML model with optimized plurality of ML model parameters, and wherein the best ML model is updated with the revised best ML model whenever the revised ML model is determined.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIGS. 8A through 8B (collectively referred as FIG. 8) is a flow diagram illustrating a method for ML based prediction of fastest solver combination for solution of matrix equations for CFD simulations, using the system of FIGS. 1 and 2, in accordance with some embodiments of the present disclosure.

Figure 1:
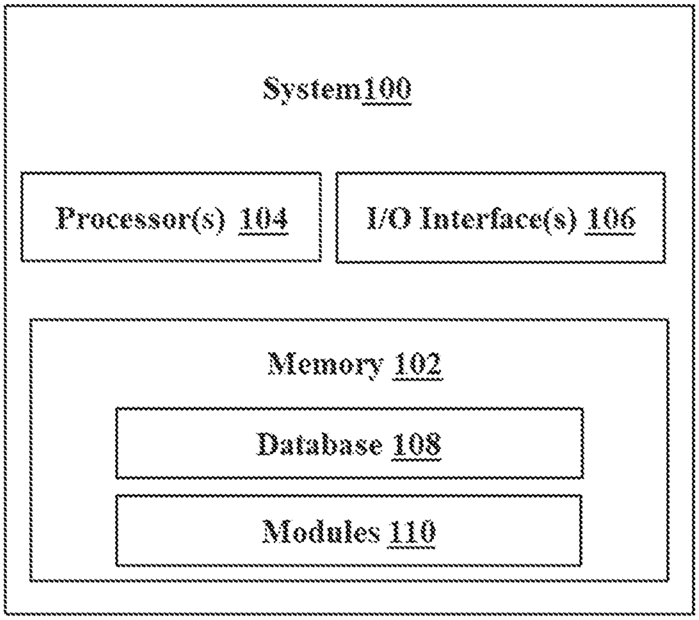
FIG. 1 is a functional block diagram of a system, for Machine Learning (ML) based prediction of fastest solver combination for solution of matrix equations for Computational Fluid Dynamics (CFD) simulations, in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Machine Learning (ML) approaches in literature for determining an optimal solver-preconditioner-smoother for solving matrix equations in computer modelling or computer simulations of any systems are directly dependent on matrix property calculation as an intermediate step. As understood, existing approaches are inefficient as calculation of matrix properties is a computation expensive and time-consuming task and is a technical limitation of the works in the art.

Further, the solver combination is highly dependent on the type of problem at hand, and thus even for a same domain problem the selection of solver combination varies from problem to problem. For example, Computational Fluid Dynamics (CFD) domain, a solver combination for lid driven cavity flow may not be the right choice for flow over an Ahmed body problem. Thus, correct selection of a solver combination is critical to generate simulation results in least possible time. However incorrect choice of pre-conditioner and solver out weights both accuracy and speed. These matrix systems, or matrix equations can be solved using direct and iterative solvers. There exist two types of solvers for solving this matrix system, namely direct solvers, and iterative solvers. Direct solvers have computational complexity of the order of three ($O^3$) in terms of mesh size, but they provide an exact solution. While iterative solvers have low computational complexity ($O^1$) in term of mesh size, but they provide approximate solution and need initial values for the field variables. In practice, iterative solvers are used predominantly in CFD analysis due to their computational efficacy.

Further, in case of Computational Fluid Dynamics (CFD) domain, the system or matrix equations is generated from CFD model input parameters provided by the modeler. Further, part of input parameter's relation with the matrix equations can be derived from the theory. Hence, the theory knowledge or domain knowledge can directly be used to predict solver combination without extracting matrix system.

Existing commercial CFD simulation tools such as such as Ansys Fluent™, Ansys CFX™, Star-CCM+™ carryout the selection of solvers automatically but the strategy of solver selection is propriety. Also, this automatic selection of solver may not be accurate, but CFD user has no choice to select the combination since it is hidden for him. With open-source CFD tools such as SU2™ and Open-FOAM™, the selection of iterative solvers needs to be done manually, by the user, as part of model creation. Thus, if these Open-source tools are assisted with an accurate automated solver selection approach, they can provide a time efficient and accurate CFD simulation system.

However practical challenge for using ML based solver selection approaches available in literature to be used in conjunction with existing CFD simulation tools is a) the approaches are dependent on matrix properties, b) many CFD tools do not provide access matrix system for the CFD user so the literature methods cannot be applied for solver selection and c) ML techniques that calculates coefficient matrix properties are computationally expensive and time-consuming and is a technical limitation of the works in the art.

Embodiments of the present disclosure provide a method and system for CFD model parameter-based ML based prediction of fastest solver combination for solution of matrix equations during CFD simulations. The system trains a Machine Learning (ML) model using CFD model parameters such as physics, numerical schemes etc., wherein a set of relevant input parameters is selected based on domain knowledge of a CFD problem of interest. The ML model is a multi-class classification model for the prediction of solver combination taking the CFD model parameters as an input and eliminates dependency of training of the ML model for solver combination prediction on matrix properties, without compensating accuracy of prediction. Once the fastest solver combination is obtained, the solver can be utilized to simulate a CFD model of interest with minimal simulation time using for example, an opensource CFD toolbox OpenFOAM™ that provides a high-speed simulation advantage.

Thus, the method and system disclosed provides efficient approach for solver combination selection using CFD model parameters, which is computationally less expensive and time-efficient task and addresses the technical limitation of the works in the art. Further, selecting the relevant features from among the CFD model parameters using domain knowledge enables selecting the solver combination specific to the CFD problem, hence accuracy of CFD simulation is improved. Furthermore, the method provides a general solution which learns from new problems and updates itself, thus is a self-learning system.

Referring now to the drawings, and more particularly to FIGS. 1 through 10B, where similar reference characters denote corresponding features consistently throughout the figures, there are shown preferred embodiments and these embodiments are described in the context of the following exemplary system and/or method.

FIG. 1 is a functional block diagram of a system 100, for ML based prediction of fastest solver combination for solution of matrix equations during Computational Fluid Dynamics (CFD) simulations, in accordance with some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, and the like.

The I/O interface(s) 106 can include a variety of software and hardware interfaces, for example, a web interface, a graphical user interface and the like and can facilitate multiple communications within a wide variety of networks N/W and protocol types, including wired networks, for example, LAN, cable, etc., and wireless networks, such as WLAN, cellular and the like. In an embodiment, the I/O interface (s) 106 can include one or more ports for connecting to a number of external devices or to another server or devices.

The memory 102 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes.

In an embodiment, the memory 102 includes a plurality of modules 110 for performing steps of pre-processing 204, solver selection at step 206, mapping at step 208, and self-learning 212 for training and prediction of fastest solver combination for a CFD model for simulation. Further, the plurality of modules 110 include programs or coded instructions that supplement applications or functions performed by the system 100 for executing different steps involved in the process of predicting fastest solver combination for a CFD model, being performed by the system 100. The plurality of modules 110, amongst other things, can include routines, programs, objects, components, and data structures, which performs particular tasks or implement particular abstract data types. The plurality of modules 110 may also be used as, signal processor(s), node machine(s), logic circuitries, and/or any other device or component that manipulates signals based on operational instructions. Further, the plurality of modules 110 can be used by hardware, by computer-readable instructions executed by the one or more hardware processors 104, or by a combination thereof. The plurality of modules 110 can include various sub-modules (not shown).

Figure 2:
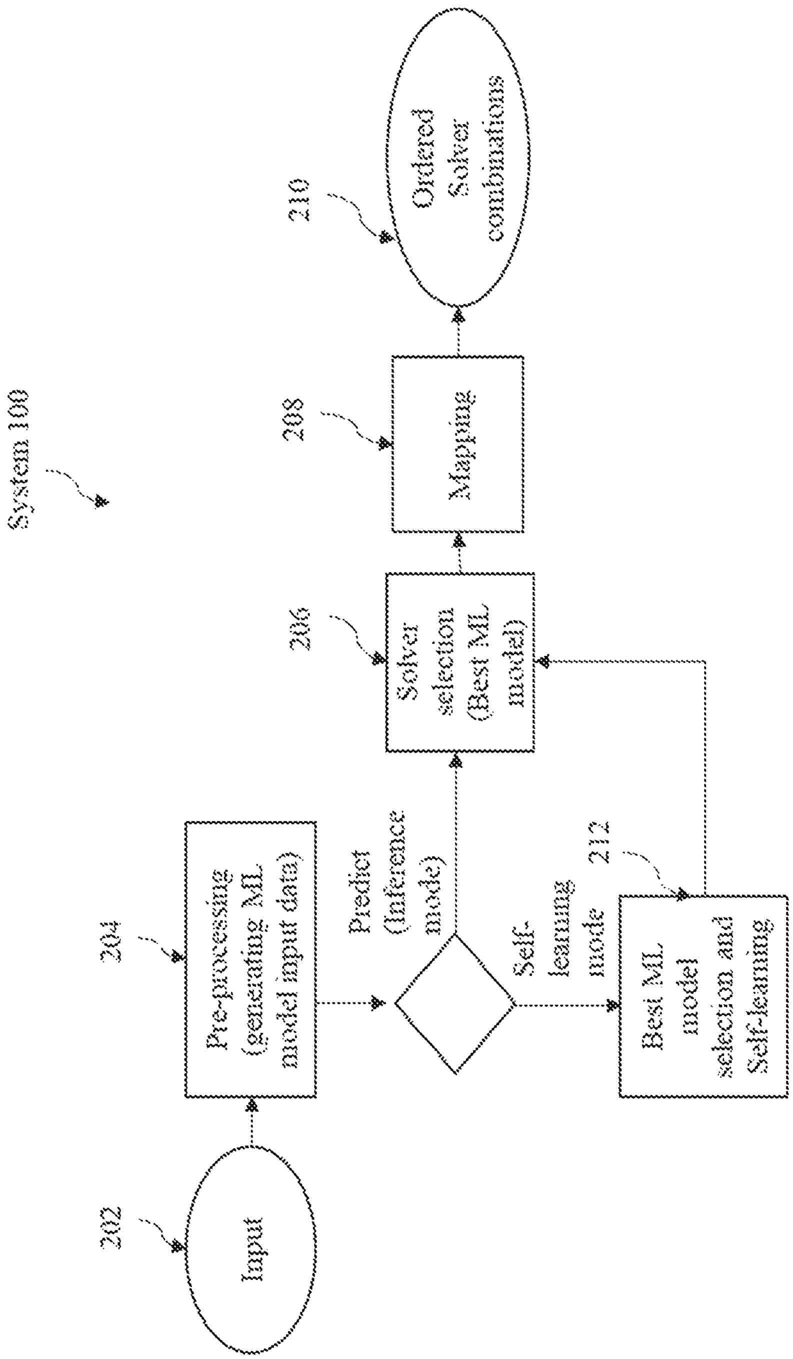
FIG. 2 illustrates a process overview of the system of FIG. 1, in accordance with some embodiments of the present disclosure.

Further, the memory 102 may comprise information pertaining to input(s)/output(s) of each step performed by the processor(s) 104 of the system 100 and methods of the present disclosure. Further, the memory 102 includes a database 108. The database (or repository) 108 may include a plurality of abstracted piece of code for refinement and data that is processed, received, or generated as a result of the execution of the plurality of modules in the module(s) 110. As depicted in FIG. 2. the database 108 can store the plurality of input parameters that include a plurality of parameters associated with numerically discretized geometry that defines fluid dynamics domain and a plurality of Computational Fluid Dynamics (CFD) model parameters of a CFD model. The CFD model parameters further comprising a plurality of governing equations, initial and boundary conditions, a plurality of numerical schemes designed for discretizing each of plurality of terms of the plurality of governing equations, and a plurality of solution algorithms and simulation control parameters. The database 108 can also store ordered solver combinations generated at step 210.

Although the data base 108 is shown internal to the system 100, it will be noted that, in alternate embodiments, the database 108 can also be implemented external to the system 100, and communicatively coupled to the system 100. The data contained within such external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS). Functions of the components of the system 100 are now explained with reference to steps in flow diagrams in FIG. 8 with help of architectural overview of the system 100 as depicted in FIG. 2 along with FIGS. 3 through 7.

FIG. 2 illustrates a process overview of the system 100 of FIG. 1, in accordance with some embodiments of the present disclosure. The system 100 has four major functional blocks (residing in modules 110) that perform steps of preprocessing (204), solver selection (206), mapping (208) and self-learning (212) based on an input (202) received by the system 100. The mandatory input required for the system 100 are numerically discretized geometry (mesh) and CFD model that are consistence in nature from CFD simulation perspective. CFD mesh represent three-dimensional geometry in discretized form whereas model include model include governing equations, boundary conditions, numerical schemes, etc. The system 100 operates in two modes as shown in FIG. 2. These are a self-learning mode and an inference mode. An inference mode is used for prediction of solver combination for the given inputs from the CFD model and mesh using a best ML model identified using the self-training pretrained. Whereas during Self-learning, the new model is trained and saved as an updated ML model, interchangeably referred to as best ML model, into the solver selection module. The data and labels for this self-learning mode is generated using simulation experiments and solver combinations list: FIGS. 3, 4, 5 and 6 together describes the self-learning mode, while FIGS. 3, 4, 6 and 7 together describes the inference mode.

The system 100 is trained and then used for inferencing during inferencing mode. Each of the training phase, inferencing phase is explained below in detail.

Figure 3:
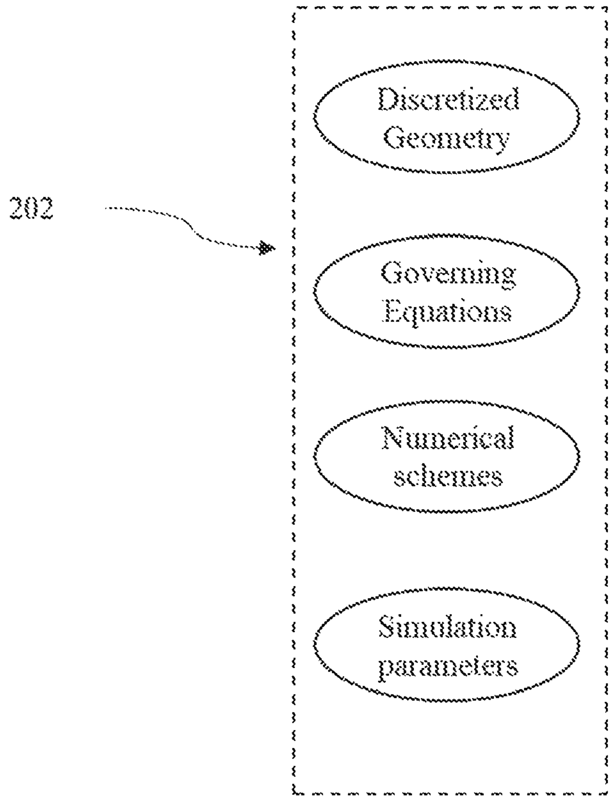
FIGS. 3 to 7 illustrate elements and modules of the system of FIG. 1 in accordance with the process overview of FIG. 2, in accordance with some embodiments of the present disclosure.

TRAINING: As depicted in FIG. 3, the inputs interchangeably referred to as input parameters, which are preprocessed at step 202 comprise:

1) Discretized Geometry: The geometry used for numerical simulation is first discretized using discretization/meshing tool. The quality of this discretized geometry can be assessed using parameters such as cell volume, aspect ratio, skewness, and non-orthogonality. The field of parameter values is extracted for every geometry and can provided as the input. Additionally, dimension of the geometry, type of mesh can also be the input.
2) Governing Equations: These can include physical variables for which matrix system is formed and solver preconditioner is needed. These parameters are pressure, velocity, temperature, turbulent kinetic energy, turbulent dissipation rate, etc. at least one or more variables for the input for ML model.
3) Numerical schemes: Each term in the governing equation such as Transient term or diffusion term, has specific meaning in physical domain and hence each of these terms have their own set of choices for numerical schemes. Here, each term is considered as a categorical variable which can hold specific numerical scheme name as a value and are provided as an inputs to machine learning model. These inputs are encoded in categorical variables.
4) Solution algorithm: As well known in the art, there are multiple algorithms for pressure velocity decoupling, for example, these include: A Pressure-Implicit with Splitting of Operators (PISO) algorithm, Semi Implicit Pressure Linked Equations (SIMPLE), etc. Each of these algorithms needs some parameters to be specified for using it for simulation. These include maximum number of pressure loops/iterations, Max number of iterations in in step of algo, etc. Solution Control: Here, parameters which control the simulation aspects are specified. These may include residue tolerances for local and global convergence, under relaxation factors, courant numbers etc.

Computational aspect: Here, parameters which control the computational aspects are specified. These can include type of parallelization techniques such as domain decomposition, number of domains, etc.

Figure 4:
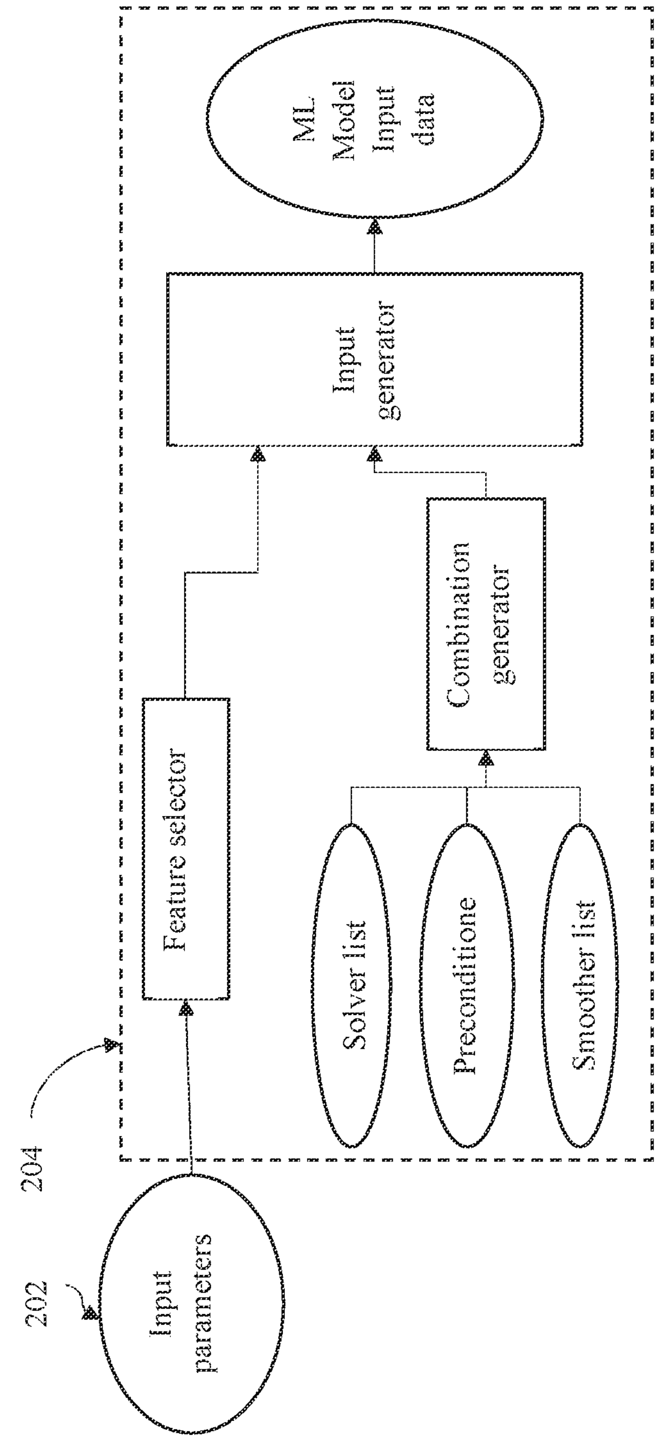

FIG. 4 illustrates the preprocessing step (204) being performed by a feature selector, a combination generator, and an input generator.

a) Feature selector: This module includes techniques for selecting one or more of the plurality of input parameters (202) relevant for the prediction of solver combination. This module also abstracts the information from the input field and converts it into the vector or single numerical value. Further, the categorical values are converted to numerical value using encoding such as one hot encoding.
b) Combination generator: For numerically solving matrix equations, solvers, preconditioners and/or smoothers are required. From all the available values for solvers, preconditioners and smoothers, combination generator creates valid possible combination list that can be used for numerical simulation.
c) Input generator: Preprocessed inputs and solver combinations are then combined in the input generator. The categorical values are converted to numerical value using encoding such as one hot encoding. This forms single input parameter set for training a ML model.

Figure 5:
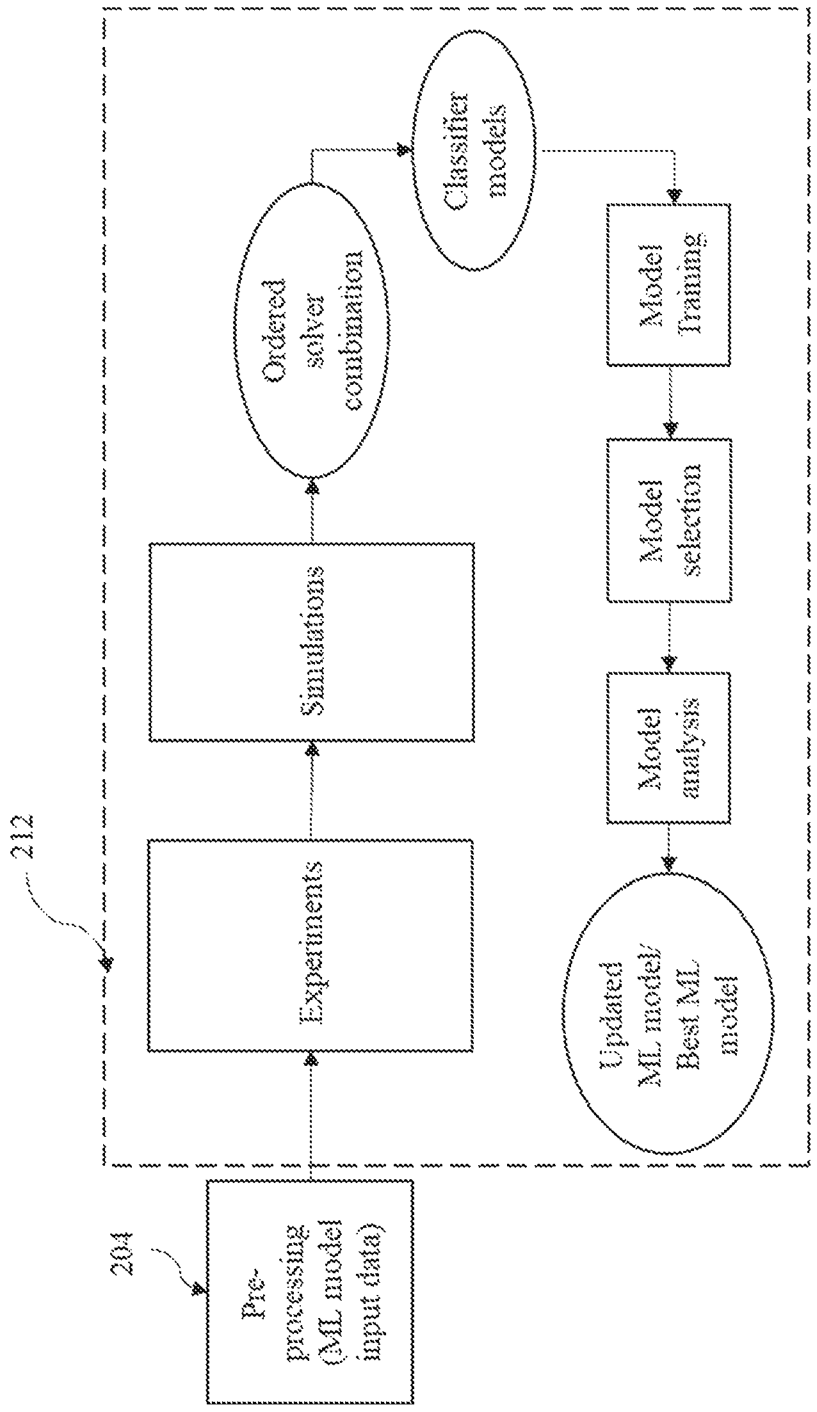

FIG. 5 depicts the ML model training and identifying the updated ML model (best ML model) from among a plurality of trained ML models to be used during inferencing mode for prediction. The model input data generated by the preprocessing step (204) as in FIG. 4 is provided to the self-learning step (212) for training the ML models and identifying the best ML model. The step of self-learning is executed by blocks comprising Experiments, Simulations and Model Training, Model Selection, Model Analysis.

a) Experiments: In this block, an ML model input from the ML model input data is used to design different numerical simulation input sets for which simulations are to be performed. Simulations are performed for single ML input set with varied solver combinations. The output from this sub module is the set of inputs for numerical simulations.
b) Simulations: This block simulates all the scenarios corresponding to input set using simulation tool such as OpenFOAM™, etc. The CPU time required for each of these simulations are then recorded and scenarios are arranged in the ascending order of simulation time with solver combination of each scenario.
c) Model Training: Model training uses ordered solver combination as an input along with ML model input data. A plurality of ML models are trained, from which the best ML model is selected based on performance specific threshold. These ordered combinations are converted to classes using binning process. For example, for a single input parameter set, all the observations for each solver combinations are arranged in ascending order of simulation time. Then each of the simulation time is normalized by the lowest simulation time. These normalized simulation time vales are then binned based on thresh-hold and class labels are assigned to them. This forms a label column in training. The data is divided into train and validation. The training is then performed on train data using various machine learning techniques like Logistic Regression, Naive Bayes, K Neighbors Classifier, SVM—Linear Kernel, Decision Tree Classifier, Random Forest Classifier, Gradient Boosting Classifier, LDA, etc. The classification performance in terms of F1 score, Precision, Recall, AUC curve, etc. is obtained for each model.

d) Model Selection: The performance specific threshold based on the performance value for F1 score, Area Under Curve (AUC) value and receiver operating characteristic curve (ROC curve), the best ML model is selected for further prediction task.

e) Model Analysis: In this block, the best ML model is tuned for the hyperparameters, and its analysis is done on the validation data. This ML model architecture is then saved as 'updated ML model or best ML model' along with its weights. This updated ML model (best ML model) is then pushed to the solver selection step (206).

Thus, once training phase is completed the updated ML model (best ML model) is obtained, which is then used during inferencing (inferencing mode).

Figure 6:
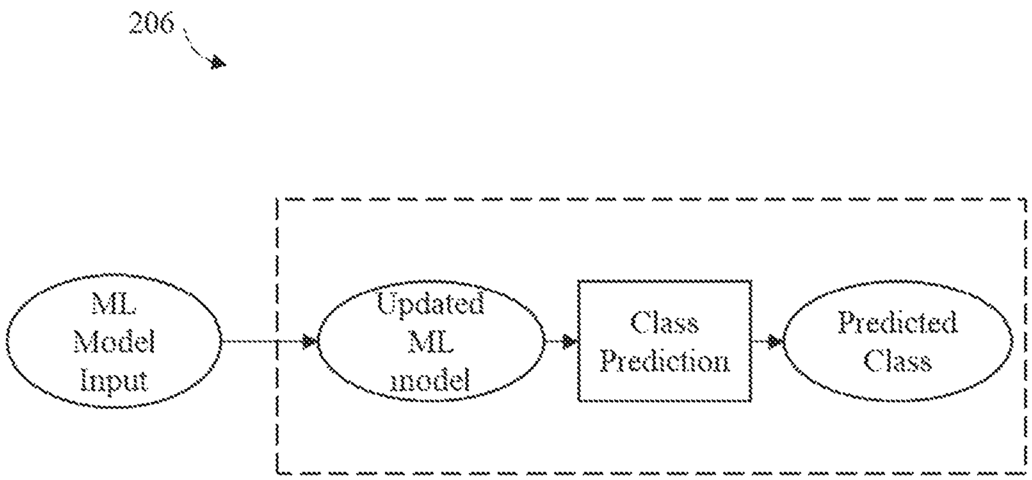

INFERENCE MODE for predicting the fastest solver combination in accordance with received input parameters: In the inference or prediction mode, the input parameters (202) described in FIG. 3 and the preprocessing step (204) described in FIG. 4 is used to generate ML model input data for the best ML model. These inputs are then provided to solver selection step (206) as depicted in FIG. 6. The solver selection step (206) comprises the updated ML model or the best ML model along with weights and a class prediction module. As depicted in FIG. 6, ML model inputs from the preprocessing step (204) are used by the class prediction module (with Updated ML model) and prediction is done in terms of class values for the ML model inputs to provide the fastest solver combination.

Figure 7:
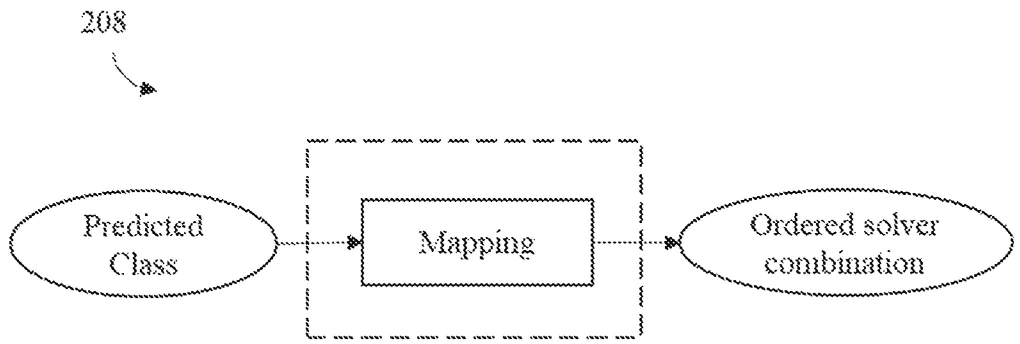

FIG. 7 depicts the mapping step (208). The ML model inputs along with class values received from FIG. 4 and the solver selection step (206) using one hot encoded, the solver combinations are then converted to solver combination names corresponding to each class value. This list of ordered solver combinations are then provided as an output, indicating the best solver combination for given input parameters i.e., a fastest solver combination for a CFD model of interest.

Figure 8B:
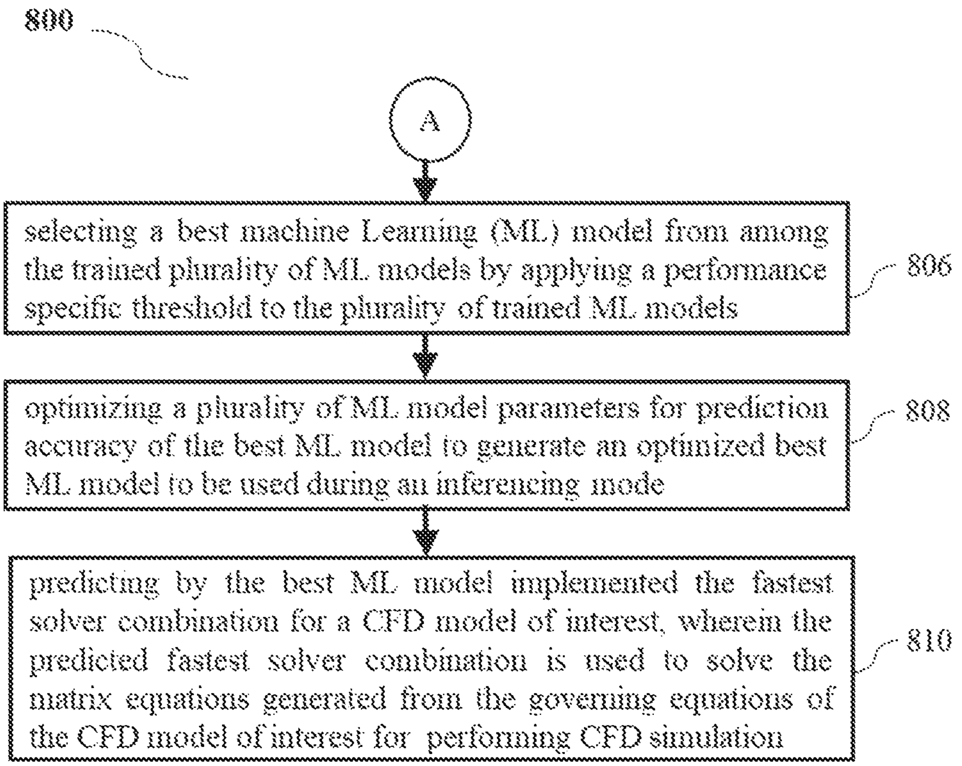

FIGS. 8A through 8B (collectively referred as FIG. 8) is a flow diagram illustrating a method 800 for prediction of fastest solver combination for solution of matrix equations for CFD simulations, using the system of FIGS. 1, in accordance with some embodiments of the present disclosure.

In an embodiment, the system 100 comprises one or more data storage devices or the memory 102 operatively coupled to the processor(s) 104 and is configured to store instructions for execution of steps of the method 800 by the processor(s) or one or more hardware processors 104. The steps of the method 800 of the present disclosure will now be explained with reference to the components or blocks of the system 100 as depicted in FIGS. 1 and 2 and the steps of flow diagram as depicted in FIG. 8. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring to the steps of the method 800, at step 802 of the method 800, the one or more hardware processors 104 receive the plurality of input parameters (as depicted in step 202) comprising the plurality of parameters associated with numerically discretized geometry that defines fluid dynamics domain and a plurality of Computational Fluid Dynamics (CFD) model parameters of a CFD model. As depicted in FIG. 3, the CFD model parameters further comprise the plurality of governing equations, initial and boundary conditions, the plurality of numerical schemes designed for discretizing each of plurality of terms of the plurality of governing equations, and a plurality of solution algorithms and simulation control parameters.

At step 804 of the method 800, the one or more hardware processors 104 train a plurality of Machine Learning (ML) models using a supervised learning technique for predicting a fastest solver combination having a minimum simulation time for the CFD model. A solver combination comprises a solver and at least one of a preconditioner and a smoother. Each of the plurality of ML models are trained using a plurality of ML model input data generated by:

a) Identifying a set of relevant input parameters from among the plurality input parameters as a plurality of input features by the feature selector (as depicted in FIG. 4) in accordance with domain knowledge of a CFD problem of interest. From the simulation studies, it is understood that values of these input parameters affect fastest solver combination. The method 800, utilizes automated feature selection, as depicted at step 204, and further elaborated in conjunction with 4, for all relevant the input parameters using Pycaret™ feature selection technique known in the art. For example, features corresponding to parameters such as numerically discretized geometry plays an important role when geometry is complex. These parameters are selected by performing Ensemble model-based Feature importance using Pycaret™. Directly acquiring information of the CFD model from the input parameters eliminates dependency of training of the ML model on properties of matrix system comprising matrix equations generated from the plurality of governing equations.

b) Identifying a plurality of solver combinations as a plurality of output features by the combination generator (as depicted in FIG. 4) using a solver list, a preconditioner list, and a smoother list. The plurality of solver combinations is arranged in ascending order of relevance into a plurality of bins, tagged with a plurality of associated labels based on a simulation time, for defining the plurality of output features. The relevance of each of the plurality of solver combinations is estimated as a simulation time taken by a solver combination for the simulation of the CFD model.

c) Combining the set of relevant input parameters and the plurality of solver combinations by the input generator (as depicted in FIG. 4), to generate the plurality of ML model input data.

Steps below indicate training process of the plurality of ML models:

1) Select one or more plurality of input parameters relevant for the prediction of solver combination using the feature selector depicted in and explained in conjunction with FIG. 4 and create an exhaustive list of solver combinations using combination generator. This step generates input parameters for machine learning model (ML model input as in FIG. 4) using input data generator.
2) Using the ML-model-input, as explained in conjunction with FIG. 4, utilize the updated Machine Learning (ML) model for predicting a class (referred to as predicted class in (FIG. 6) of each input parameter combination for the CFD model as depicted in FIG. 5.
3) Using the predicted class (FIG. 6), perform mapping the predicted class for each combination with each of the solver combination for the CFD model (as in FIG. 7). The list is then ordered in ascending order of CPU time with respect to classes to get fastest solver combination.
4) Create simulation input parameter set by performing experiments and performing simulations to generate ordered solver combinations as in step (210) list with simulation time as depicted in and explained in conjunction with FIG. 5. This the part of self-learning step (212) is active during the automated training of the ML model and during the self-learning mode active in background during inferencing mode explained in conjunction with method of FIG. 8. This ordered solver combinations list is then provided to solver selection (206) for performing training of the ML models (step 804).

ML models used for the model building can include Logistic Regression, Naive Bayes, K Neighbors Classifier, SVM—Linear Kernel, Decision Tree Classifier, Random Forest Classifier, Gradient Boosting Classifier, Light Gradient Boosting Machine, Linear Discriminant Analysis (LDA) and Quadratic Discriminant Analysis.

At step 806, the one or more hardware processors select the best ML model from among the trained plurality of ML models by applying a performance specific threshold to the plurality of trained ML models, and The performance specific threshold refers to comparing the performance of all the trained models based on average accuracy, recall and F1 score to select the best model is selected as explained in and explained in conjunction with the model selection block of FIG. 5.

Figure 9A:
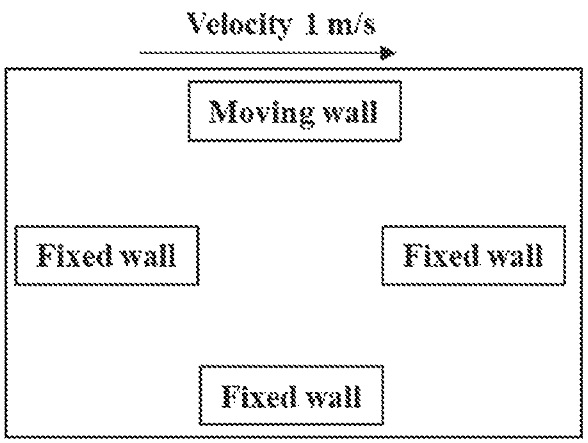
FIG. 9A depicts a standard CFD simulation problem of lid driven cavity flow for which a fastest solver combination is determined by the system of FIG. 2, in accordance with some embodiments of the present disclosure.
Figure 9B:
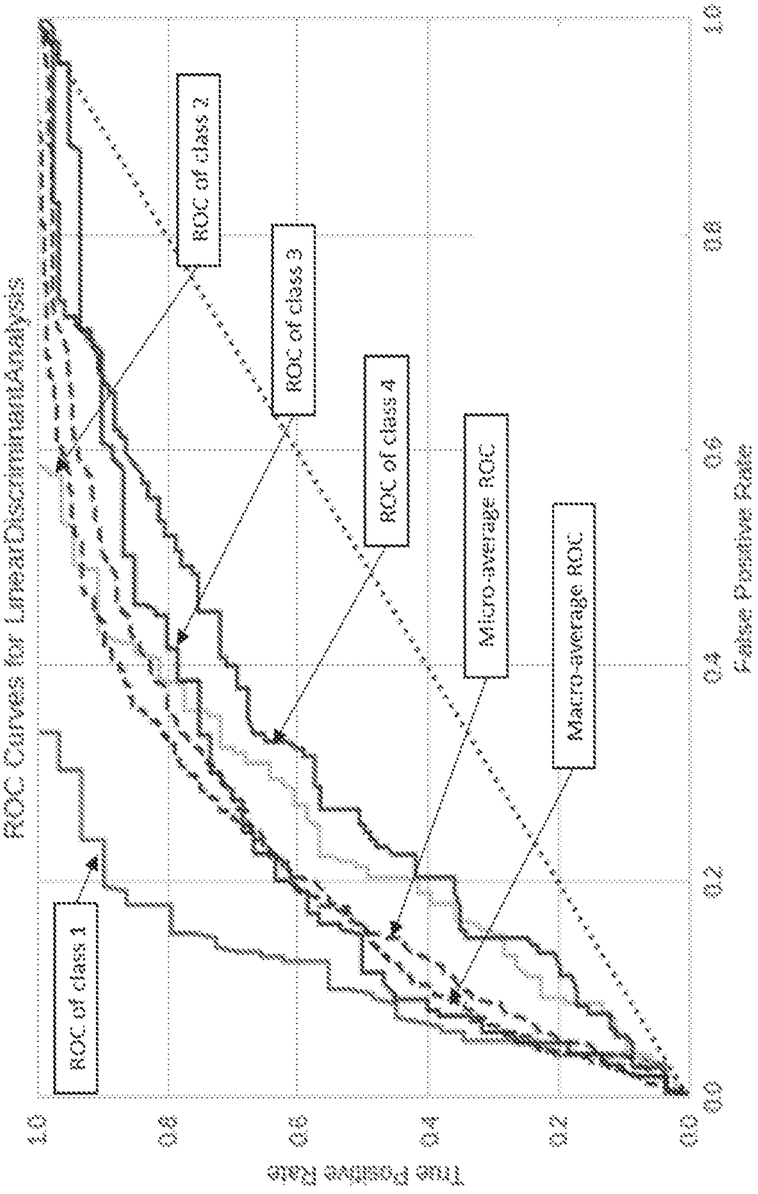
FIG. 9B is a graph depicting an Area Under the Curve (AUC) performance of a Linear discriminant analysis (LDA) model when used by the system of FIG. 2 for predicting a fastest solver combination, in accordance with some embodiments of the present disclosure.

Experiment input data creation for the simulations are performed for fixed set of input parameters such as physics, mesh, numerical schemes, and simulation control parameters. For each input set, varied solver preconditioner combinations are present. The convergence of the simulation is insured by allowing residuals to fall beyond fixed threshold values for all the physical variables. A simulation time is recorded for each simulation. In one of the example implementations of the method, following scope is covered with following assumptions.

a) Physics parameters are limited to incompressible single-phase flow, with turbulence modelling using k-Epsilon and k-Omega models, for steady and unsteady flows.
b) Simulation physics excludes any emergent phenomenon and hence train data largely represents (i) Steady state simulation and (ii) Transient simulation without large timescale ratio (of the order of 100)
c) Simulations does not consider initial conditions and boundary conditions as the input parameter.
d) A benchmark example of Lid driven cavity is selected for data generation as depicted in FIG. 9A.

During the training, the plurality of solver combinations is arranged in ascending order of relevance into a plurality of bins as depicted in FIG. 6, tagged with corresponding plurality of labels based on simulation time, for defining the plurality of output features. The relevance of each of the plurality of solver combinations is estimated as simulation time taken by a solver combination for the simulation of the CFD model. The entire training of the ML model is further explained with a lid driven cavity benchmark use case of CFD, as depicted in FIG. 10A.

Labelling the Data: For a single input parameter set, all the observations are arranged in ascending order of simulation time. Then each of the simulation time is normalized by the lowest simulation time. These normalized simulation time vales are then binned based on thresh-hold and class labels are assigned to them as shown in table 1 below.

TABLE 1

| Bin Range | 1-1.05 | 1.05-1.1 | 1.1-1.2 | 1.2-1.3 |
|---|---|---|---|---|
| Label | Fastest | Fast | Slow | Slowest |

The best Machine Learning (ML) model is selected by applying the performance specific threshold to plurality of trained ML models. ML model performance comparison based on classification evaluation metrics namely average accuracy, recall, precision and F1 score for the training data. For the use benchmark CFD problem of the lid driven cavity flow, it is observed that Linear discriminant analysis (LDA) model shows highest F1 score (metric for multi-class classification evaluation) of 56% for the training data.

At step 808 of the method 800, the one or more hardware processors 104 optimize a plurality of ML model parameters for prediction accuracy of the best ML model to generate an optimized best ML model to be used during an inferencing mode. The model analysis block explained in conjunction with FIG. 5 explains the optimization of the ML model parameters. The best ML model with the optimized parameters is used for fastest solver combination prediction during inference mode In the given case study, LDA performs well for the F1 score and AUC hence selected as the best model, as explained in conjunction with Once the trained best ML model is identified, then at step 810 of the method 800 during the inferencing mode, the one or more hardware processors 104 via the best ML model, predict the fastest solver combination for each of a plurality of new input parameters associated with each of a plurality of CFD models of interest. The predicted fastest solver combination is used to solve the plurality of matrix equations generated from the plurality of governing equations of the CFD model of interest for performing CFD simulation, for example using the Open-FOAM™ CFD simulation opensource tool.

The self-learning mode actively runs in background during the inferencing mode for self-learning based on received new inputs during inferencing mode. For self-learning, each of the new set of plurality of input parameters that are received during the inferencing mode are continuously shared with the self-learning mode to determine a revised best ML model with optimized plurality of ML model parameter. Once the revised best ML model is determined, the best ML model is updated with the revised best ML model. Thus, any later inferencing utilizes the revised ML model that has learnt over new input data received during inferencing. The self-learning steps remain similar to self-learning step 212 elaborated in conjunction with training of the system 100 with help of FIG. 5.

CASE STUDY: The training process for fastest solver combination selection using the best ML model for a lid driven cavity benchmark problem is explained below. As depicted in FIG. 10A, lid driven cavity consists of a fluid filled square cavity 2 with three boundary surfaces stationary and a top one moving. A tangential velocity of 1 m/s is applied at the top boundary which drives the fluid flow in the cavity. For the remaining three walls, the velocity is 0 m/s. The flow induced in the cavity due to top boundary is then simulated using an opensource CFD toolbox OpenFOAM™. The tool provides no limitations on the number of jobs to be run or cores to be used. Many industrial scale problems can be solved with good accuracy. Currently, performed the simulations are performed on OpenFOAM™-v7 on 32 GB ram machine.

A. Model input parameters: Model inputs are divided into four categories as below.

1. Numerically discretized geometry parameters: Quality parameters such as cell aspect ratio, cell skewness and cell non-orthogonality largely affect matrix system generated during CFD simulation. The matrix system in turn affects the efficient solver pre-conditioner-smoother combination. These mesh quality parameters are directly provided as numerical features to the ML model. The mesh parameters used for model building are explained in Table 2 along with sample input data. From the simulation studies, we have found out that mesh quality parameters such as cell volume, cell non-orthogonality, cell skewness, and cell aspect ratio affect Fastest solver combination. Since these quality parameters are defined for each cell of the mesh and hence form field of values. For the current problem in the case study of FIG. 3, the important values of these quality parameters are abstracted from their field using Autoencoder based model as depicted in FIG. 5 in the form of latent variables and these variables form features for the final ML model which is multiclass classifier.

TABLE 2

| Mesh Size | Aspect ratio | Non-Orthogonality | Skewness |
|---|---|---|---|
| 10000 | 1 | 0 | 0 |
| 10000 | 1.44 | 0 | 0 |
| 10000 | 2.16 | 0 | 0 |
| 10000 | 1.44 | 0.5 | 0 |
| 10000 | 2.16 | 0.5 | 0 |
| 2500 | 1.94 | 26.56 | 0.69 |
| 2500 | 2 | 45 | 1 |
| 2500 | 1.88 | 26.56 | 0.72 |
| 2500 | 1.5 | 26.56 | 0.5 |
| 2500 | 1.94 | 26.56 | 0.69 |

2. Physics Parameters: These parameters include all the field variables for which matrix system is formed and solver preconditioner is needed. These parameters are pressure, velocity, temperature etc. specifically for the lid cavity driven problem. ML model input is in terms of presence and absence of primary variable. Table III below shows the model inputs for physics. In the table header, U is Velocity, P is Pressure, T is Temperature, k is Turbulent Kinetic energy, E is Turbulent Dissipation rate for k-E model and w is Dissipation rate for k-w model.

TABLE 3

| U | P | T | K | ϵ | ω |
|---|---|---|---|---|---|
| 1 | 1 | 1 | 0 | 0 | 0 |
| 1 | 1 | 0 | 0 | 1 | 0 |
| 1 | 1 | 0 | 0 | 0 | 1 |
| 1 | 1 | 0 | 1 | 0 | 0 |
| 1 | 1 | 0 | 0 | 0 | 0 |

3. Numerical schemes parameters: Each term in the governing equation has specific meaning in physical domain and hence each of these terms has their own set of choices for numerical schemes. Here, each term is considered as a categorical variable which can hold specific numerical scheme name as a value and are provided as an inputs to machine learning model. These inputs are encoded in categorical variables. Table 4A and 4B (collectively referred as Table 4) shows the sample form of these inputs.

TABLE 4A

| Time | Interpolation | Surface Normal Gradient |
|---|---|---|
| Steady State | linear | Corrected |
| Crank Nicolson | upwind phi | Uncorrected |
| Euler | Limited Linear phi 1.0 | Limited |
| backward | VanLeer01 | bounded |

TABLE 4B

| Gradient | Divergence | Laplacian |
|---|---|---|
| Gauss Linear | Gauss Linear | Gauss Linear corrected |
| Gauss limited Linear | Gauss limited Linear | Gauss Linear uncorrected |
| Gauss limitedLinear01 | Gauss limitedLinear01 | Gauss Upwind corrected |
| Gauss linear Upwind | Gauss linear Upwind | Gauss Upwind uncorrected |

4. Simulation parameters: Solution algorithm: Once governing equations are discretized using numerical schemes, a system of equations is obtained which are nonlinear and coupled. Meshing operation divides the physical domain into many small numbers of cells whereas in numerical discretization, each term of the governing equations is discretized using scheme specific to that term. These discretized equations are then applied to each and every cell of the meshed domain. Simulation algorithm then decouples and linearizes these equations to form a system of linear equations (matrix system) of the form Ax=b. These systems of linear equations are then solved using iterative methods to obtain a numerical solution of field variables x. Thus, the systems are made linear for each physical variable and variables are also decoupled using solution algorithm. A Pressure-Implicit with Splitting of Operators (PISO) algorithm, well known in the art is used for current lid driven cavity case and is used throughout the current case study. With the above 4 steps the CFD case for the lid driven cavity is ready for the simulation.

Solution control: For industrial problems with large mesh size, it is impossible to perform the simulation in a serial manner and hence various parallelization techniques are used. One such technique is domain decomposition. In domain decomposition technique, mesh is divided into a finite number of domains and numerical solution is obtained for each of these domains on each separate compute node in parallel way. OpenFOAM™ has its own version of domain decomposition technique. This has decomposition method and number of domains as the parameters. In the case study, the method uses number of domains as an input parameter of our model and decomposition method is kept fixed (that is Scotch method).

5. Solver, Pre-conditioner, Smoother (Solver combination list) in OpenFOAM™: Once all the input parameters are selected by the CFD expert, a combination of Solver, Pre-conditioner and/or Smoother need to be selected for each matrix system. The following Table 5 shows important choices available for Solver, Pre-conditioner, and Smoother each. A large set of combinations can be created by selecting solver with preconditioner or smoother.

TABLE 5

| Pre-Conditioner | Solver | Smoother |
|---|---|---|
| Diagonal | PPCR | DIC |
| DIC | Diagonal | DIC GaussSeidel |
| DILU | GAMG | DILU |
| FDIC | PPCG | DILU GaussSeidel |
| GAMG | PBiCG | GaussSeidel |

B. Model training: By performing simulations using above input data labelled data is generated with 1200 datapoints. The dataset was made balanced by randomly selecting 250 datapoints for each class out of total. These 1000 datapoints points were further split into train and validation in 90:10 ratio. A model is trained for each of the ML techniques and training with 5-fold cross validation is performed.

RESULTS: Table 6 shows the ML model performance comparison based on classification evaluation metrics namely average accuracy (A), recall (R), precision (P) and F1 score (F1) for the training data. It is observed that Linear discriminant analysis (LDA) model shows highest F1 score (metric for multi-class classification evaluation) of 56% for the training data.

TABLE 6

| Model | A | R | P | F1 |
|---|---|---|---|---|
| Logistic Regression | 0.55 | 0.50 | 0.55 | 0.53 |
| Naive Bayes | 0.41 | 0.43 | 0.59 | 0.37 |
| K Neighbors Classifier | 0.44 | 0.42 | 0.43 | 0.43 |
| SVM - Linear Kernel | 0.46 | 0.45 | 0.50 | 0.43 |
| Decision Tree Classifier | 0.46 | 0.43 | 0.47 | 0.46 |
| Random Forest Classifier | 0.47 | 0.41 | 0.46 | 0.46 |
| Gradient Boosting Classifier | 0.53 | 0.48 | 0.53 | 0.52 |
| Light Gradient Boosting M/c | 0.50 | 0.45 | 0.50 | 0.50 |
| LDA | 0.56 | 0.53 | 0.57 | 0.56 |
| Quadratic-DA | 0.40 | 0.26 | 0.29 | 0.25 |

The LDA technique is selected for further tuning or optimization of ML model parameters and prediction. The LDA model is tuned or optimized for the hyper-parameters such as solver, tolerance, and shrinkage and the eigen solver with 0.001 shrinkage and 0.001 tolerance is selected for final model. An "Area Under Curve (AUC)" curve 3 is plotted to understand the model performance for each class. It is evident from the curve that the above LDA model can predict the fastest label with fairly good accuracy. Class 1 (Fastest label) is more important to us since it represents optimal solver preconditioner combination for the given simulation. Table 7 depicts the ML Model (LDA) performance on the test data.

TABLE 7

| Accuracy | Recall | Precision | F1 Score |
|---|---|---|---|
| 0.5698 | 0.5557 | 0.5766 | 0.571 |

Model prediction: Remaining 200 number of data points which were excluded during training and validated are selected as a test set. Since these datapoints are for the same CFD simulation case and are randomly selected, Independent and Identical Distribution (IID) assumption for the ML modelling is satisfied. The table below shows the observation of fair performance of the model on the test data.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Thus, the method and system disclosed, by eliminating dependency on the matrix properties of the CFD model for solver combination selection, provides efficient approach, which is computationally less expensive and time-efficient task and addresses the technical limitation of the works in the art. Further, selecting the relevant features from among the CFD mode parameters using on domain knowledge enables selecting the solver combination specific to the CFD problem, hence accuracy of CFD simulation is improved.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

i. It is intended that the disclosure and examples be considered as exemplary only, with a true scope of disclosed embodiments being indicated by the following claims.

What is claimed is:

1. A processor implemented method for prediction of fastest solver combination for solution of matrix equations, the method comprising:

receiving, by one or more hardware processors, a plurality of input parameters comprising a plurality of parameters associated with numerically discretized geometry that defines a fluid dynamics domain and a plurality of Computational Fluid Dynamics (CFD) model parameters of a CFD model, wherein the plurality of CFD model parameters comprising a plurality of governing equations, one or more initial and boundary conditions, a plurality of numerical schemes designed for discretizing each of plurality of terms of the plurality of governing equations, and a plurality of solution algorithms and simulation control parameters;

training, by the one or more hardware processors, a plurality of Machine Learning (ML) models using a supervised learning technique for predicting a fastest solver combination having a minimum simulation time for the CFD model, a solver combination comprising a solver and at least one of a preconditioner and a smoother, wherein each of the plurality of ML models are trained using ML model input data generated by:

(a) identifying a set of relevant input parameters from among the plurality input parameters as a plurality of input features by a feature selector in accordance with domain knowledge of a CFD problem of interest, eliminating dependency of training of the plurality of ML models based on properties of a matrix system comprising a plurality of matrix equations generated from the plurality of governing equations, (b) identifying a plurality of solver combinations as a plurality of output features by a combination generator using a solver list, a preconditioner list and a smoother list, wherein the plurality of solver combinations is arranged in ascending order of relevance into a plurality of bins, tagged with a plurality of associated labels based on a simulation time, for defining the plurality of output features, and wherein the relevance of each of the plurality of solver combinations is estimated as a simulation time taken by a solver combination for the simulation of the CFD model; and (c) combining the set of relevant input parameters and the plurality of solver combinations by an input generator, to generate the ML model input data; and selecting, by the one or more hardware processors, a best machine Learning (ML) model from among the trained plurality of ML models by applying a performance specific threshold to the plurality of trained ML models; and optimizing, by the one or more hardware processors, a plurality of ML model parameters for prediction accuracy, F1 score and AUC value of the best ML model to generate an optimized best ML model to be used during an inferencing mode.

2. The method of claim 1, wherein the inferencing mode comprises predicting, via the optimized best ML model the fastest solver combination for each of a plurality of new input parameters associated with each of a plurality of CFD model of interests, wherein the predicted fastest solver combination is used to solve the plurality of matrix equations generated from the plurality of governing equations of the CFD model of interest for performing CFD simulation.

3. The method of claim 2, further comprises a self-learning mode, wherein each of the new set of plurality of input parameters that are received during the inferencing mode are continuously shared with the self-learning mode to determine a revised best ML model with optimized plurality of ML model parameters, and wherein the best ML model is updated with the revised best ML model whenever the revised ML model is determined.

4. A system for prediction of fastest solver combination for solution of matrix equations, the method comprising:

a memory storing instructions;

one or more Input/Output (I/O) interfaces; and one or more hardware processors coupled to the memory via the one or more I/O interfaces, wherein the one or more hardware processors are configured by the instructions to:

receive a plurality of input parameters comprising a plurality of parameters associated with numerically discretized geometry that defines a fluid dynamics domain and a plurality of Computational Fluid Dynamics (CFD) model parameters of a CFD model, wherein the plurality of CFD model parameters comprising a plurality of governing equations, one or more initial and boundary conditions, a plurality of numerical schemes designed for discretizing each of plurality of terms of the plurality of governing equations, and a plurality of solution algorithms and simulation control parameters;

train a plurality of Machine Learning (ML) models using a supervised learning technique for predicting a fastest solver combination having a minimum simulation time for the CFD model, a solver combination comprising a solver and at least one of a preconditioner and a smoother, wherein each of the plurality of ML models are trained using ML model input data generated by:

(a) identifying a set of relevant input parameters from among the plurality input parameters as a plurality of input features by a feature selector in accordance with domain knowledge of a CFD problem of interest, eliminating dependency of training of the plurality of ML models based on properties of a matrix system comprising a plurality of matrix equations generated from the plurality of governing equations, (b) identifying a plurality of solver combinations as a plurality of output features by a combination generator using a solver list, a preconditioner list and a smoother list, wherein the plurality of solver combinations is arranged in ascending order of relevance into a plurality of bins, tagged with a plurality of associated labels based on a simulation time, for defining the plurality of output features, and wherein the relevance of each of the plurality of solver combinations is estimated as a simulation time taken by a solver combination for the simulation of the CFD model; and (c) combining the set of relevant input parameters and the plurality of solver combinations by an input generator, to generate the ML model input data; and select a best machine Learning (ML) model from among the trained plurality of ML models by applying a performance specific threshold to the plurality of trained ML models; and optimize a plurality of ML model parameters for prediction accuracy, F1 score and AUC value of the best ML model to generate an optimized best ML model to be used during an inferencing mode.

5. The system of claim 4, wherein during the inferencing mode the one or more hardware processors are configured to predict via the optimized best ML model the fastest solver combination for each of a plurality of new input parameters associated with each of a plurality of CFD model of interests, wherein the predicted fastest solver combination is used to solve the plurality of matrix equations generated from the plurality of governing equations of the CFD model of interest for performing CFD simulation.

6. The system of claim 5, further comprises a self-learning mode, wherein each of the new set of plurality of input parameters that are received during the inferencing mode are continuously shared with the self-learning mode to determine a revised best ML model with optimized plurality of ML model parameters, and wherein the best ML model is updated with the revised best ML model whenever the revised ML model is determined.

7. One or more non-transitory machine-readable information storage mediums comprising one or more instructions which when executed by one or more hardware processors cause:

receiving a plurality of input parameters comprising a plurality of parameters associated with numerically discretized geometry that defines a fluid dynamics domain and a plurality of Computational Fluid Dynamics (CFD) model parameters of a CFD model, wherein the plurality of CFD model parameters comprising a plurality of governing equations, one or more initial and boundary conditions, a plurality of numerical schemes designed for discretizing each of plurality of terms of the plurality of governing equations, and a plurality of solution algorithms and simulation control parameters;

training a plurality of Machine Learning (ML) models using a supervised learning technique for predicting a fastest solver combination having a minimum simulation time for the CFD model, a solver combination comprising a solver and at least one of a preconditioner and a smoother, wherein each of the plurality of ML models are trained using ML model input data generated by:

a) identifying a set of relevant input parameters from among the plurality input parameters as a plurality of input features by a feature selector in accordance with domain knowledge of a CFD problem of interest, eliminating dependency of training of the plurality of ML models based on properties of a matrix system comprising a plurality of matrix equations generated from the plurality of governing equations, b) identifying a plurality of solver combinations as a plurality of output features by a combination generator using a solver list, a preconditioner list and a smoother list, wherein the plurality of solver combinations is arranged in ascending order of relevance into a plurality of bins, tagged with a plurality of associated labels based on a simulation time, for defining the plurality of output features, and wherein the relevance of each of the plurality of solver combinations is estimated as a simulation time taken by a solver combination for the simulation of the CFD model; and c) combining the set of relevant input parameters and the plurality of solver combinations by an input generator, to generate the ML model input data; and selecting a best machine Learning (ML) model from among the trained plurality of ML models by applying a performance specific threshold to the plurality of trained ML models; and optimizing a plurality of ML model parameters for prediction accuracy, F1 score and AUC value of the best ML model to generate an optimized best ML model to be used during an inferencing mode.

8. The one or more non-transitory machine-readable information storage mediums of claim 7, wherein the inferencing mode comprises predicting, via the optimized best ML model the fastest solver combination for each of a plurality of new input parameters associated with each of a plurality of CFD model of interests, wherein the predicted fastest solver combination is used to solve the plurality of matrix equations generated from the plurality of governing equations of the CFD model of interest for performing CFD simulation.

9. The one or more non-transitory machine-readable information storage mediums of claim 8, comprises a self-learning mode, wherein each of the new set of plurality of input parameters that are received during the inferencing mode are continuously shared with the self-learning mode to determine a revised best ML model with optimized plurality of ML model parameters, and wherein the best ML model is updated with the revised best ML model whenever the revised ML model is determined.

* * * * *